US008981661B2

(12) United States Patent
Melanson et al.

(10) Patent No.: US 8,981,661 B2
(45) Date of Patent: Mar. 17, 2015

(54) POWERING HIGH-EFFICIENCY LIGHTING DEVICES FROM A TRIAC-BASED DIMMER

(71) Applicant: Cirrus Logic, Inc., Austin, TX (US)

(72) Inventors: John L. Melanson, Austin, TX (US); Eric King, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/084,662

(22) Filed: Nov. 20, 2013

(65) Prior Publication Data
US 2014/0077721 A1 Mar. 20, 2014

Related U.S. Application Data

(63) Continuation of application No. 13/194,531, filed on Jul. 29, 2011, now Pat. No. 8,716,957, which is a continuation-in-part of application No. 12/858,164, filed on Aug. 17, 2010, now Pat. No. 8,569,972, and a
(Continued)

(51) Int. Cl.
H05B 41/16 (2006.01)
H05B 37/02 (2006.01)
H05B 33/08 (2006.01)

(52) U.S. Cl.
CPC ........ H05B 33/0815 (2013.01); H05B 33/0845 (2013.01); H05B 37/0263 (2013.01); Y02B 20/346 (2013.01)
USPC ........................................... 315/246; 315/360

(58) Field of Classification Search
USPC ............. 315/291, 307, 224, 246, 247, 209 R, 315/360, 248
See application file for complete search history.

(56) References Cited

U.S. PATENT DOCUMENTS

| 4,523,128 A | 6/1985 | Stamm et al. |
| 5,055,746 A | 10/1991 | Hu et al. |
| 5,319,301 A | 6/1994 | Callahan et al. |
| 5,321,350 A | 6/1994 | Haas |

(Continued)

FOREIGN PATENT DOCUMENTS

| EP | 1164819 | 12/2001 |
| EP | 2257124 A1 | 1/2010 |

(Continued)

OTHER PUBLICATIONS

Adrian Z Amanci, et al. "Synchronization System with Zero-Crossing Peak Detection Algorithm for Power System Applications." 2010 IPEC Conference. Jun. 2010. pp. 2884-2991. Publisher: IEEE. Piscataway, NJ, USA.

(Continued)

Primary Examiner — Minh D A
(74) Attorney, Agent, or Firm — Mitch Harris, Atty at Law, LLC; Andrew M. Harrs

(57) ABSTRACT

A circuit for powering high-efficiency lighting devices from a thyristor-controlled dimmer operates a switching power circuit during active portions of half-cycles of the AC line voltage source that supplies the dimmer. A control circuit determines the durations of the active portions such that sufficient energy is transferred to operate the lighting devices until a next half-cycle of the AC line voltage, at which time the active portion of the half-cycle is terminated. A high impedance level is presented to the output of the dimmer until the next half-cycle commences.

21 Claims, 8 Drawing Sheets

Related U.S. Application Data continuation-in-part of application No. 12/894,440, filed on Sep. 30, 2010, now Pat. No. 8,729,811.

(60) Provisional application No. 61/369,202, filed on Jul. 30, 2010, provisional application No. 61/437,355, filed on Jan. 28, 2011, provisional application No. 61/410,269, filed on Nov. 4, 2010.

(56) References Cited

U.S. PATENT DOCUMENTS

| | | | |
|---|---|---|---|
| 5,430,635 A | 7/1995 | Liu | |
| 5,691,605 A | 11/1997 | Xia et al. | |
| 5,770,928 A | 6/1998 | Chansky et al. | |
| 6,043,635 A | 3/2000 | Downey | |
| 6,046,550 A | 4/2000 | Ference et al. | |
| 6,091,205 A * | 7/2000 | Newman et al. | 315/194 |
| 6,211,624 B1 | 4/2001 | Holzer | |
| 6,380,692 B1 * | 4/2002 | Newman et al. | 315/194 |
| 6,407,514 B1 | 6/2002 | Glaser et al. | |
| 6,621,256 B2 | 9/2003 | Muratov et al. | |
| 6,713,974 B2 | 3/2004 | Patchornik et al. | |
| 6,858,995 B2 | 2/2005 | Lee et al. | |
| 6,900,599 B2 | 5/2005 | Ribarich | |
| 7,102,902 B1 | 9/2006 | Brown et al. | |
| 7,180,250 B1 | 2/2007 | Gannon | |
| 7,184,937 B1 | 2/2007 | Su et al. | |
| 7,288,902 B1 | 10/2007 | Melanson | |
| 7,656,103 B2 | 2/2010 | Shteynberg et al. | |
| 7,719,246 B2 | 5/2010 | Melanson | |
| 7,719,248 B1 | 5/2010 | Melanson | |
| 7,733,678 B1 | 6/2010 | Notohamiprodjo et al. | |
| 7,759,881 B1 | 7/2010 | Melanson | |
| 7,786,711 B2 | 8/2010 | Wei et al. | |
| 7,872,427 B2 | 1/2011 | Scianna | |
| 8,102,167 B2 | 1/2012 | Irissou et al. | |
| 8,115,419 B2 | 2/2012 | Given et al. | |
| 8,169,154 B2 | 5/2012 | Thompson et al. | |
| 8,212,491 B2 | 7/2012 | Kost et al. | |
| 8,212,492 B2 | 7/2012 | Lam et al. | |
| 8,222,832 B2 | 7/2012 | Zheng et al. | |
| 8,569,972 B2 | 10/2013 | Melanson | |
| 8,749,173 B1 | 6/2014 | Melanson et al. | |
| 2004/0105283 A1 | 6/2004 | Schie et al. | |
| 2004/0196672 A1 | 10/2004 | Amei | |
| 2004/0212321 A1 | 10/2004 | Lys et al. | |
| 2006/0022648 A1 | 2/2006 | Ben-Yaakov et al. | |
| 2006/0208669 A1 | 9/2006 | Huynh et al. | |
| 2007/0182338 A1 | 8/2007 | Shteynberg et al. | |
| 2007/0182347 A1 | 8/2007 | Shteynberg | |
| 2008/0018261 A1 | 1/2008 | Kastner | |
| 2008/0143266 A1 | 6/2008 | Langer | |
| 2008/0192509 A1 | 8/2008 | Dhuyvetter et al. | |
| 2008/0205103 A1 | 8/2008 | Sutardja et al. | |
| 2008/0224629 A1 | 9/2008 | Melanson | |
| 2008/0224633 A1 | 9/2008 | Melanson | |
| 2008/0224636 A1 | 9/2008 | Melanson | |
| 2008/0232141 A1 | 9/2008 | Artusi et al. | |
| 2009/0059632 A1 | 3/2009 | Li et al. | |
| 2009/0134817 A1 | 5/2009 | Jurngwirth et al. | |
| 2009/0184665 A1 | 7/2009 | Ferro | |
| 2009/0195186 A1 | 8/2009 | Guest et al. | |
| 2009/0284182 A1 | 11/2009 | Cencur | |
| 2010/0002480 A1 | 1/2010 | Huynh et al. | |
| 2010/0013405 A1 | 1/2010 | Thompson et al. | |
| 2010/0013409 A1 | 1/2010 | Quek et al. | |
| 2010/0066328 A1 | 3/2010 | Shimizu et al. | |
| 2010/0128501 A1 | 5/2010 | Huang et al. | |
| 2010/0164403 A1 | 7/2010 | Liu | |
| 2010/0164406 A1 | 7/2010 | Kost et al. | |
| 2010/0213859 A1 | 8/2010 | Shteynberg et al. | |
| 2010/0231136 A1 | 9/2010 | Reisenauer et al. | |
| 2010/0244726 A1 | 9/2010 | Melanson | |
| 2010/0270989 A1 | 10/2010 | Sasaki et al. | |
| 2011/0043133 A1 | 2/2011 | Van Laanen et al. | |
| 2011/0080110 A1 | 4/2011 | Nuhfer et al. | |
| 2011/0084622 A1 | 4/2011 | Barrow et al. | |
| 2011/0084623 A1 | 4/2011 | Barrow | |
| 2011/0115395 A1 | 5/2011 | Barrow et al. | |
| 2011/0121754 A1 | 5/2011 | Shteynberg | |
| 2011/0148318 A1 | 6/2011 | Shackle et al. | |
| 2011/0204797 A1 | 8/2011 | Lin et al. | |
| 2011/0204803 A1 | 8/2011 | Grotkowski et al. | |
| 2011/0234115 A1 | 9/2011 | Shimizu et al. | |
| 2011/0266968 A1 | 11/2011 | Bordin et al. | |
| 2011/0276938 A1 | 11/2011 | Perry et al. | |
| 2011/0291583 A1 | 12/2011 | Shen | |
| 2011/0309759 A1 | 12/2011 | Shteynberg et al. | |
| 2012/0049752 A1 | 3/2012 | King et al. | |
| 2012/0068626 A1 | 3/2012 | Lekatsas et al. | |
| 2012/0112651 A1 | 5/2012 | King et al. | |
| 2012/0286686 A1 | 11/2012 | Watanabe et al. | |
| 2013/0002156 A1 | 1/2013 | Melanson et al. | |
| 2013/0154495 A1 | 6/2013 | He | |

FOREIGN PATENT DOCUMENTS

| | | |
|---|---|---|
| EP | 2232949 | 9/2010 |
| JP | 2008053181 A | 3/2008 |
| JP | 2009170240 A | 7/2009 |
| WO | WO 02/096162 A1 | 11/2002 |
| WO | WO 2006/079937 A1 | 8/2006 |
| WO | 2008029108 | 3/2008 |
| WO | 2010011971 A1 | 1/2010 |
| WO | WO 2010027493 A2 | 3/2010 |
| WO | WO 2010035155 A2 | 4/2010 |
| WO | WO 2011008635 A1 | 1/2011 |
| WO | WO 2011/050453 A1 | 5/2011 |
| WO | WO 2011/056068 A2 | 5/2011 |
| WO | WO 2012/016197 A1 | 2/2012 |

OTHER PUBLICATIONS

Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, 9 pages (pp. 1-9 in pdf), dowloaded from www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

(56) References Cited

OTHER PUBLICATIONS

Why Different Dimming Ranges?, 2003, 1 page, downloaded from http://www.lutron.com/TechnicalDocumentLibrary/LutronBallastpg3.pdf.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

Vainio, et al., "Digital Filtering for Robust 50/60 Hz Zero-Crossing Detectors", IEEE Transactions on Instrumentation and Measurement, Apr. 1996, pp. 426-430, vol. 45, No. 2, Piscataway, NJ, US.

Patterson, James. "Efficient Method for Interfacing Triac Dimmers and LEDs", EDN Network, Jun. 23, 2011, 4 pages (pp. 1-4 in pdf), National Semiductor Corp., UBM Tech.

\* cited by examiner

POWERING HIGH-EFFICIENCY LIGHTING DEVICES FROM A TRIAC-BASED DIMMER

The present U.S. Patent Application is a Continuation of U.S. patent application Ser. No. 13/194,531 filed on Jul. 29, 2011 and published as U.S. Patent Publication No. 20120025729 on Feb. 2, 2012, and therefore claims priority thereto under 35 U.S.C. §120. This Patent Application also claims priority under 35 U.S.C. §119(e) to U.S. Provisional Patent Application Ser. No. 61/369,202 filed on Jul. 30, 2010, Ser. No. 61/410,269 filed on Nov. 4, 2010, Ser. No. 61/437,355 filed on Jan. 28, 2011 and claims priority under 35 U.S.C. §120 to U.S. patent application Ser. No. 12/858,164 entitled "DIMMER OUTPUT EMULATION", filed on Aug. 17, 2010 and issued as U.S. Pat. No. 8,569,972 on Oct. 29, 2013, and U.S. patent application Ser. No. 12/894,440, entitled "DIMMING MULTIPLE LIGHTING DEVICES BY ALTERNATING ENERGY TRANSFER FROM A MAGNETIC STORAGE ELEMENT", filed on Sep. 30, 2010 and published as U.S. Patent Publication No. 20120025733 on Feb. 2, 2012, each having at least one common inventor and assigned to the same Assignee. The disclosures of the above-referenced U.S. Patent Applications are incorporated herein by reference.

BACKGROUND OF THE INVENTION

1. Field of the Invention

The present invention relates generally to lighting device power sources such as those included within dimmable light emitting diode lamps, and in particular to a lighting device power source that provides proper operation of a triac-based dimmer while powering high-efficiency lighting devices.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

In particular, in dimmable high-efficiency replacement light bulbs, the low energy requirements of the lighting devices makes it difficult for the dimmers to operate properly, as the typical triac-controlled dimmer is designed for operation with a load that requires on the order of ten times the current required by the typical high-efficiency lighting device. Therefore, dimmable high-efficiency replacement lighting device circuits must ensure that the dimmer operates properly in conjunction with the lighting devices, i.e., supplies a sufficient amount of energy and provides a needed indication of the dimming level, so that dimming of the lighting devices can be performed.

Therefore, it would be desirable to provide a dimmable high-efficiency lighting device power source circuit that provides proper operation of a triac-based dimmer circuit.

SUMMARY OF THE INVENTION

The invention is embodied in a circuit for supplying power to high efficiency lighting devices from a thyristor-controlled dimmer circuit, an IC including such a circuit and a method of operation of the circuit.

The circuit includes a switching power circuit that transfers energy from the dimmer during active portions of half-cycles of the AC line voltage. A control circuit that controls the switching power circuit determines the active portions of the half-cycles such that sufficient energy is transferred from the input to operate the lighting devices until the next half-cycle. After the active portion of the half-cycle is ended, a high impedance level is presented to the output of the thyristor-switched dimmer circuit during an idle period that extends until next subsequent half-cycle.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for powering and controlling lighting devices. In particular embodiments, strings of light-emitting diodes (LEDs) are packaged to replace incandescent lamps, and the energy supplied to the LED strings is varied in accordance with a dimming value determined from operation of a thyristor-controlled dimmer supplying the replacement lighting device, so that dimmed operation is achieved. The present invention achieves dimming operation efficiently without mis-firing of the thyristor in the dimmer by various features that are described in further detail below.

Figure 1:
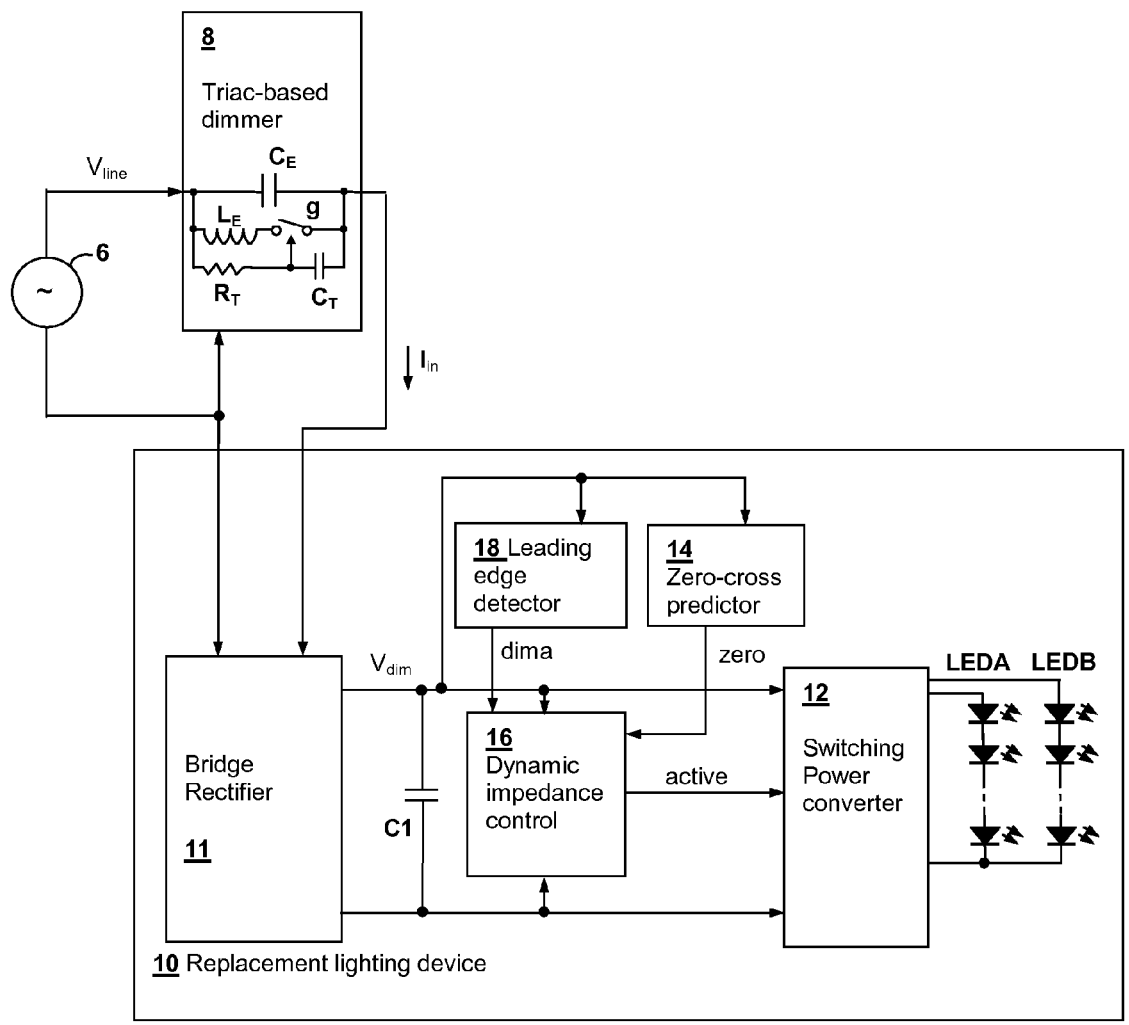
FIG. 1 is a block diagram depicting a lighting circuit in accordance with an embodiment of the present invention.

Referring now to FIG. 1, a lighting circuit in accordance with an embodiment of the invention is shown. An AC power line source 6 provides an AC line voltage $V_{line}$ to a replacement lighting device 10 through a triac-based dimmer 8 that is, for example, designed for operation with incandescent bulbs having a power consumption of 40 W or greater. Replacement lighting device 10 uses LEDs LEDA, LEDB, to supply light, which may be strings of LEDs connected in series, as shown. Since even a 100 W equivalent high-efficiency replacement bulb using LEDs consumes only 13 W of power, the current level of an LED replacement lamp will be less than ⅓ of that conducted through the minimum specified wattage incandescent bulb, and may be as low as ¹⁄₁₀th the current. Therefore, the triac in triac-based dimmer 8 can fail to trigger properly due to the reduced current conducted through the triac at the time triac-based dimmer 8 turns on. Also, the timing circuit that triggers the triac in triac-based dimmer can turn on the triac at the wrong time unless the proper conditions are present at the output of triac-based dimmer 8 from the time of the zero-crossing of AC line voltage $V_{line}$ until the triac in triac-based dimmer 8 is triggered. Further, if the operation of replacement lighting device 10, which contains a switching power converter 12 is not somehow coordinated with the cut sine wave of rectified dimmer output voltage $V_{dim}$, then switching power converter 12 may not receive all of the energy needed to supply LEDs LEDA, LEDB for the cycle. Switching power converter 12 may also improperly re-trigger triac-based dimmer 8 if a low impedance is suddenly introduced at the output of triac-based dimmer 8 by starting another active cycle of switching power converter 12 after triac-based dimmer 8 has turned off for the current cycle.

Within the block depicting triac-based dimmer 8, a model equivalent circuit is shown that is useful for describing the operation of the triac and timing circuits within an actual triac-based dimmer. The switch g illustrates operation of the triac itself, which alternately conducts current $I_{in}$ between AC power line source 6 and replacement lighting device 10. Initially, when switch g is open, EMI capacitor $C_E$ and the timing circuit formed by timing resistor $R_T$ and timing capacitor $C_T$ charge through the load applied at the output terminal of triac-based dimmer 8, which in ordinary operation is typically an incandescent bulb of 40 W or greater power consumption. Once capacitor $C_T$ is charged to a threshold voltage magnitude, switch g closes (i.e., the gate of the triac is triggered) and AC line voltage $V_{line}$ is provided to the output of triac-based dimmer through an inductor $L_E$, which is provided for EMI filtering and to reduce lamp buzz (acoustic noise in an incandescent filament). Once switch g is closed, switch g remains closed (i.e., the triac continues to conduct) until the magnitude of current $I_{in}$ conducted through triac-based dimmer 8 falls below the hold current of the triac. However, if an insufficiently low-impedance load is connected to the output of the triac, the stored energy from capacitor $C_E$, which has been dumped into inductor $L_E$, will return to capacitor $C_E$ as the parallel combination of capacitor $C_E$ and inductor $L_E$ begins to oscillate. When the current through inductor $L_E$ falls below the hold current of the triac, the triac will turn off.

In order to prevent the above-described mis-triggering triac-based dimmer 8, replacement lighting device 10 includes a dynamic impedance control circuit 16 that, upon detection of a rise in rectified dimmer output voltage $V_{dim}$ caused by a turn-on event of triac-based dimmer 8, applies a damping impedance level that is sufficient to prevent the re-triggering of the triac in triac-based dimmer 8 by damping the resonant circuit formed by capacitor $C_E$ and inductor $L_E$. The impedance at the input of replacement lighting device 10 is maintained at or below the requisite damping impedance level until a predetermined time period has passed. The requisite damping impedance level varies with the particular triac design, but is generally between 100 ohms and 1 kOhm. After the predetermined time period has passed, replacement lighting device 10 only needs to draw enough current to maintain the triac-based dimmer in a conducting state while energy needed to supply LEDs LEDA, LEDB for the cycle is being transferred. The minimum current required to maintain the conducting state is the hold current of the particular triac in triac-based dimmer 8, which is generally between 25 and 70 milliamperes. Replacement lighting device then enters a high impedance state, disabling switching power converter 12 so that a sudden change in impedance due to activation of switching power converter 12 does not trigger triac-based dimmer 8 by re-charging capacitor $C_T$ to the trigger threshold during any remaining portion of the half-cycle of AC line voltage $V_{line}$ for which the corresponding triac output cycle already been terminated.

In order to ensure that the next leading edge of the output of triac-based dimmer 8 occurs at the correct time, proper operation of the timer circuit formed by capacitor $C_T$ and resistor $R_T$ must be provided. At the time the next zero-crossing of AC line voltage $V_{line}$ occurs, and from that time until triac-based dimmer 8 turns on, a path for the input current $I_{in}$ that is charging timing capacitor $C_T$ must be provided at the input of replacement lighting device. Further, the impedance must be low enough to not generate a voltage drop across the inputs of replacement lighting device 10 that would substantially affect the trigger point of the triac, e.g., the time at which switch g closes. In order to prevent the above-described mis-operation of triac-based dimmer 8, replacement lighting device 10 includes a zero-cross prediction circuit 14 that predicts or detects a zero-cross time of AC line voltage $V_{line}$ by observing dimmer output voltage $V_{dim}$, and dynamic impedance control circuit 16 ensures that a sufficiently low "glue" impedance is presented at the input terminals of replacement lighting device from the zero-cross time until the turn-on event is detected by leading edge detection circuit 18. The glue impedance needed to ensure proper timing is generally an impedance substantially equal to 100 ohms or less. Such an impedance, if present across the dimmer output terminals during the active phase of triac-based dimmer, would require power transfer or dissipation on the order of that caused by a 100 W light bulb, but since the glue impedance is applied while the triac is off, the power transfer is only that required to operate the timer circuit formed by capacitor $C_T$ and resistor $R_T$.

Figure 2:
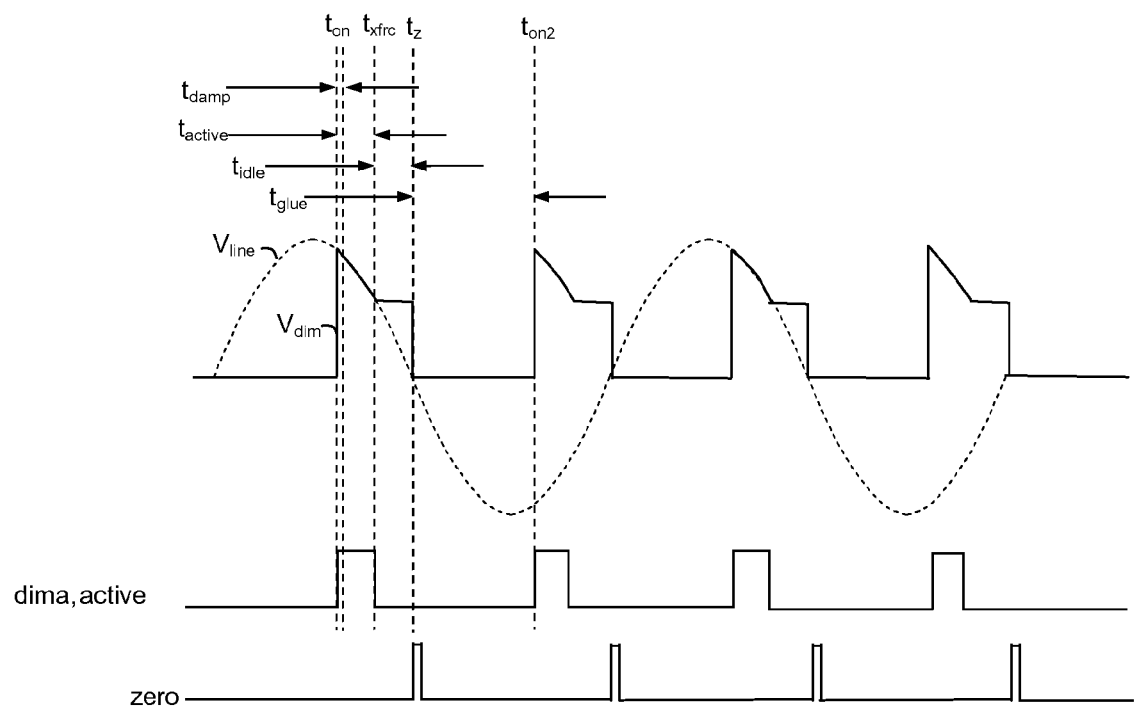
FIG. 2 is a signal waveform diagram illustrating the various phases of operation of lighting circuits in accordance with embodiments of the present invention.

Referring now to FIG. 2, the various phases of operation of replacement lighting device 10 are illustrated with reference to cycles of AC line voltage $V_{line}$ and the cut sine waveforms of rectified dimmer output voltage $V_{dim}$. During a predetermined time period $t_{damp}$ immediately following the triac turn-on event at time $t_{on}$, the damping impedance level is presented by operation of dynamic impedance control 16, when leading edge detector 18 detects the triac turn-on event and asserts control signal dima. At least a portion of the damping impedance can be provided by operation of switching power converter 12 which operates during time period $t_{active}$ beginning just after time $t_{on}$. In the depicted embodiment, control signal active, which is provided to switching power converter 12 to indicate to switching power converter 12 both when to start an energy transfer cycle, and how long the cycle may potentially extend, i.e., the maximum duration of the active cycle is the duration of the high-state pulse of control signal active. Once the possibility of resonant re-triggering of the triac has been avoided, e.g., after the energy associated with the turn-on event has been dissipated or stored for operating LEDs LEDA, LEDB, while energy is still needed by switching power converter 12 for the present cycle of AC line voltage $V_{line}$, transfer of energy is performed by switching power converter 12, and the current through triac-based dimmer 8 is maintained at or above the level of the hold current required by the triac in triac-based dimmer 8 throughout the remainder of active time period $t_{active}$. After the energy transfer is complete at time $t_{xfrc}$, the input of replacement lighting device 10 enters a high-impedance state during idle time interval $t_{idle}$. Then, once zero-crossing prediction circuit 14 indicates, by asserting control signal zero that a zero-crossing of AC line voltage $V_{line}$ is occurring, dynamic impedance control 16 asserts the glue impedance at the output of triac-based dimmer 8, so that the timer circuit in triac-based dimmer 8 formed by capacitor $C_T$ and resistor $R_T$ will charge properly and generate the next leading edge of dimmer output voltage $V_{dim}$ at the proper time $t_{on2}$. At time $t_{on2}$, the damping impedance level is again asserted at the input of replacement lighting device 10.

Figure 3A:
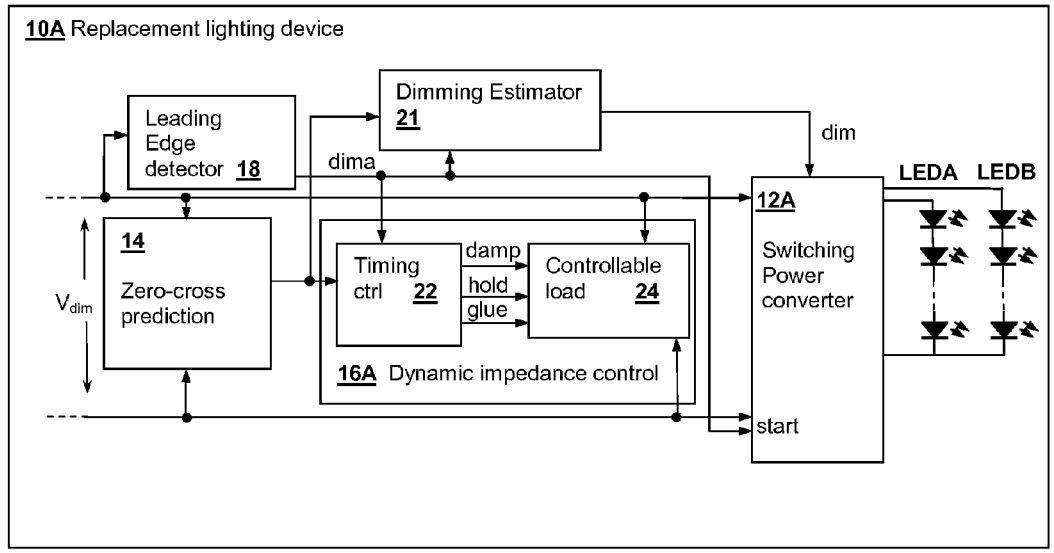
FIGS. 3A-3C are block diagrams of replacement lighting devices that can be used in the lighting circuit of FIG. 1 in accordance with various embodiments of the present invention.

Referring to FIG. 3A, an exemplary replacement lighting device 10A is shown in accordance with an embodiment of the present invention, and which may be used in the lighting circuit of FIG. 1. Replacement lighting device 10A controls the impedance presented at input terminals IN using a controllable load 24, which may be a controllable current sink, a resistor having a series-connected switching transistor, or other suitable circuit for shunting current across the output of triac-based dimmer 8. While shunting current through a dissipative load such as controllable load 24 wastes energy, depending on the energy requirements of LEDs LEDA and LEDB, it may be necessary to provide some form of dissipative loading in order to ensure proper triac operation in triac-based dimmer 8. Controllable load 24 is triggered by control signal dima, provided from an output of leading edge detector 18, which indicates to a timing control circuit 22, when to apply the damping impedance, selected by control signal damp. After the predetermined damping period has expired, e.g. at 100 uS, timing control circuit 22 de-asserts control signal damp and asserts control signal hold, which sets the minimum holding impedance to maintain the triac in the conducting state. In the depicted embodiment of replacement lighting device 10A, the holding impedance is not terminated early even if switching power converter 12A has completed energy transfer, so that the timer formed by capacitor $C_T$ within triac-based dimmer 8 charges properly and generates the next leading edge of dimmer output voltage $V_{dim}$ at the correct time. Embodiments of the invention that include idle periods are illustrated in further detail below.

Zero-cross prediction circuit 14 provides control signal zero to dynamic impedance control 16A, which causes timing circuit 22 to assert control signal glue, which in turn commands controllable load 24 to apply the glue impedance level across the input terminals, in order to provide proper operation of the timer in triac-controlled dimmer 8. Zero-cross prediction circuit 14 determines a location of the zero-crossings of AC line voltage $V_{line}$ from rectified dimmer output voltage $V_{dim}$, i.e., the voltage across input terminals IN. Since rectified dimmer output voltage $V_{dim}$ is not a sine wave both due to the leading edge cut, and also due to idle phases in some embodiments of the invention, zero-cross prediction circuit 14 uses either analog techniques, such as multiple threshold comparators to trigger waveshape generators, e.g., a parabolic waveform generator that provides a close approximation to a sinusoidal waveshape, or digital techniques such as an analog-to-digital converter (ADC) with a processing block that can extrapolate the zero crossing location from the shape of the cut sine waveform of dimmer output voltage $V_{dim}$. Such a digital circuit does not require complexity, since even a very low resolution ADC can be used to predict the zero-crossing location and generate control signal zero. A phase lock loop (PLL) can alternatively be used to predict the zero-crossing location by performing phase comparisons with the rectified dimmer output voltage $V_{dim}$ and a reference timer clock output.

A dimming estimator 21 is also included within replacement lighting device 10A and receives input from zero-cross predictor 14 and leading edge detector 18. Dimming estimator determines dimming value dim from the time periods between a zero-crossings of AC line voltage $V_{line}$ and the time that triac-based dimmer 8 turns on in the next cycle of AC line voltage $V_{line}$. Further details of dimmer waveform prediction and dimmer value determination are disclosed in the above-incorporated U.S. Patent Application entitled "DIMMER OUTPUT EMULATION", as well as in the U.S. Provisional Patent Application Ser. No. 61/410,269, which is incorporated herein by reference.

Switching power converter 12A is synchronized with the waveform of AC line voltage $V_{line}$ by control signal dima, which is provided to the start input of switching power converter 12A, ensuring that the energy transfer cycle from input terminal IN through switching power converter 12A occurs at the leading edge of the cut sine waveform of rectified dimmer output voltage $V_{dim}$. Once all of the energy needed for a given half-cycle has been transferred, power converter 12A stops transferring energy and will not start again until receiving another pulse at input start. Timing control circuit 22 can optionally terminate the half-cycle of the rectified dimmer output voltage $V_{dim}$ by raising the impedance of controllable load 24 to the high impedance state in response to a feedback signal from switching power converter 12A, generating an idle phase of operation. When zero-cross predictor 14 indicates that a zero-crossing of AC line voltage $V_{line}$ is occurring, timing control circuit 22 asserts control signal glue to apply the glue impedance level across the output of triac-controlled dimmer 8.

Figure 3B:
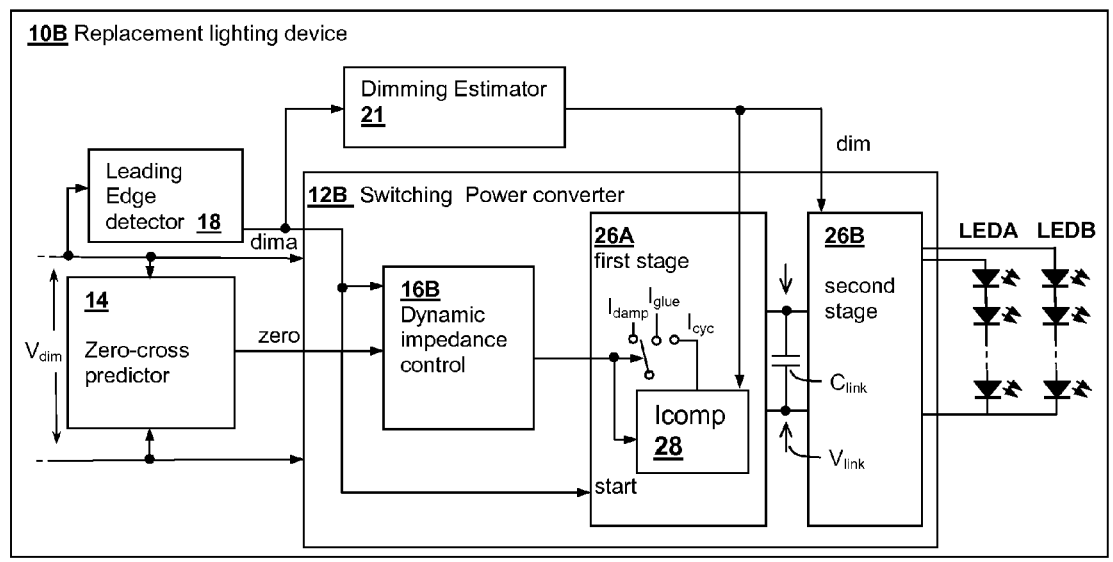

Referring now to FIG. 3B, an exemplary replacement lighting device 10B is shown in accordance with another embodiment of the present invention, and which may alternatively be used in the lighting circuit of FIG. 1. Replacement lighting device 10B is similar to replacement lighting device 10A of FIG. 3A, so only differences between the circuits will be described below. Replacement lighting device 10B controls the impedance presented at the output of triac-based dimmer 8 by operating a switching power converter 12B in a non-uniform manner. A dynamic impedance control circuit 16B is included within switching power converter 12B, and receives control signal dima from leading edge detector 18 and control signal zero from zero-cross predictor circuit 14. Dynamic impedance control circuit 16B provides one or more control signals to a first stage 26A of switching power converter 12B, which force the current transferred by first stage 26A to assume at least a minimum current level $I_{damp}$ during damping time period $t_{damp}$, and a minimum glue current level $I_{glue}$ during the time period $t_{glue}$, as illustrated in the timing of FIG. 2. A current computation block ($I_{comp}$) 28 determines the remainder (if any) current needed to complete the required transfer of energy for the current cycle, which is also based the present dimming value dim, since dimming value dim indicates how much energy will be needed to supply LEDs LEDA,LEDB from a second stage of switching power converter 26B and the duration of the active cycle of the output of triac-based dimmer 8, which determines the maximum time period first stage 26A could transfer energy, if needed. A link capacitor $C_{link}$ provides intermediate storage between first stage 26A and second stage 26B, so that first stage 26A can be operated at higher current levels (lower impedance levels) during the initial portion of the active portion of rectified dimmer output voltage $V_{dim}$ as described above and at lower current levels during the remainder of the active portion of the cycle, without causing second stage 26B to fall short of energy needed for transfer to LEDs LEDA,LEDB. Therefore, link voltage $V_{link}$ will generally vary across the half-cycle of the AC line voltage $V_{line}$ to store a greater amount of energy during the beginning of the cycle.

Figure 3C:
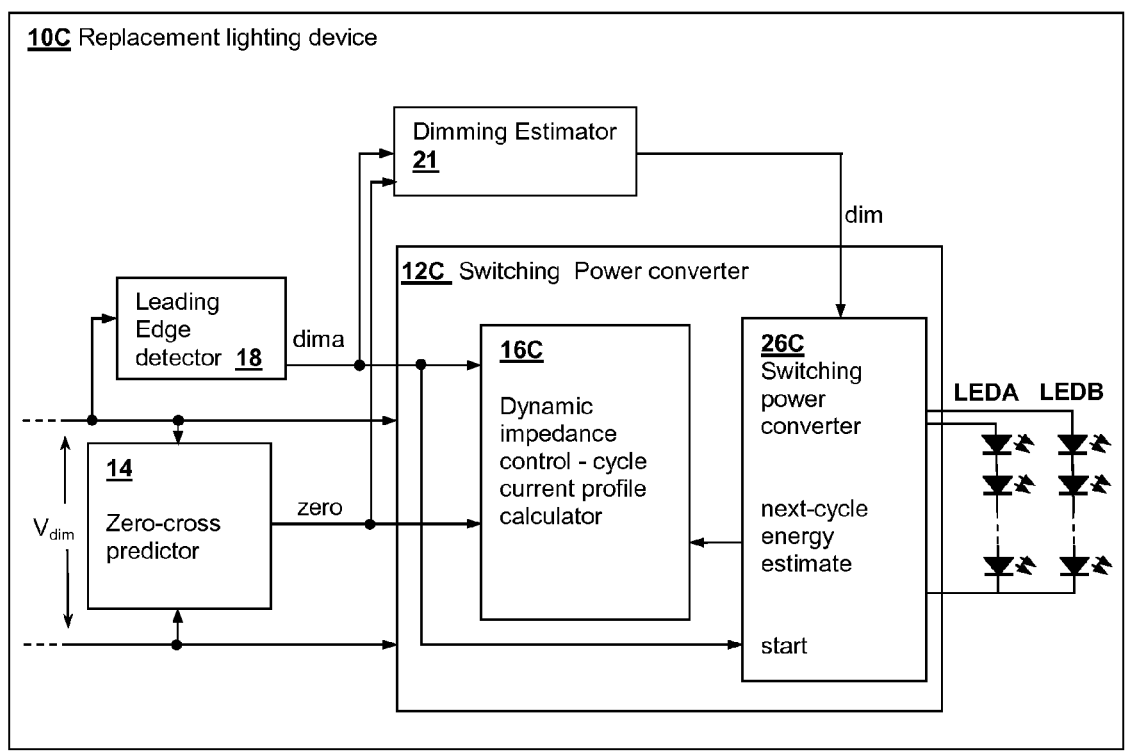

Referring now to FIG. 3C, an exemplary replacement lighting device 10C is shown in accordance with another embodiment of the present invention, and which may alternatively be used in the lighting circuit of FIG. 1. Replacement lighting device 10C is similar to replacement lighting device 10B of FIG. 3B, so only differences between the circuits will be described below. In replacement lighting device 10C, a switching power converter 12C includes a dynamic impedance control and cycle current profile calculator block 16C that receives a next-cycle energy estimate from switching power converter 26C and uses the required minimum glue and hold impedances and their associated time periods in conjunction with the next cycle energy requirements to compute a current profile for controlling switching power converter 12C. When control signal dima is asserted, switching power converter 12C transfers energy to the output, or to a link capacitor in a multi-stage implementation as shown in FIG. 3B, according to the generated current profile.

Figure 4:
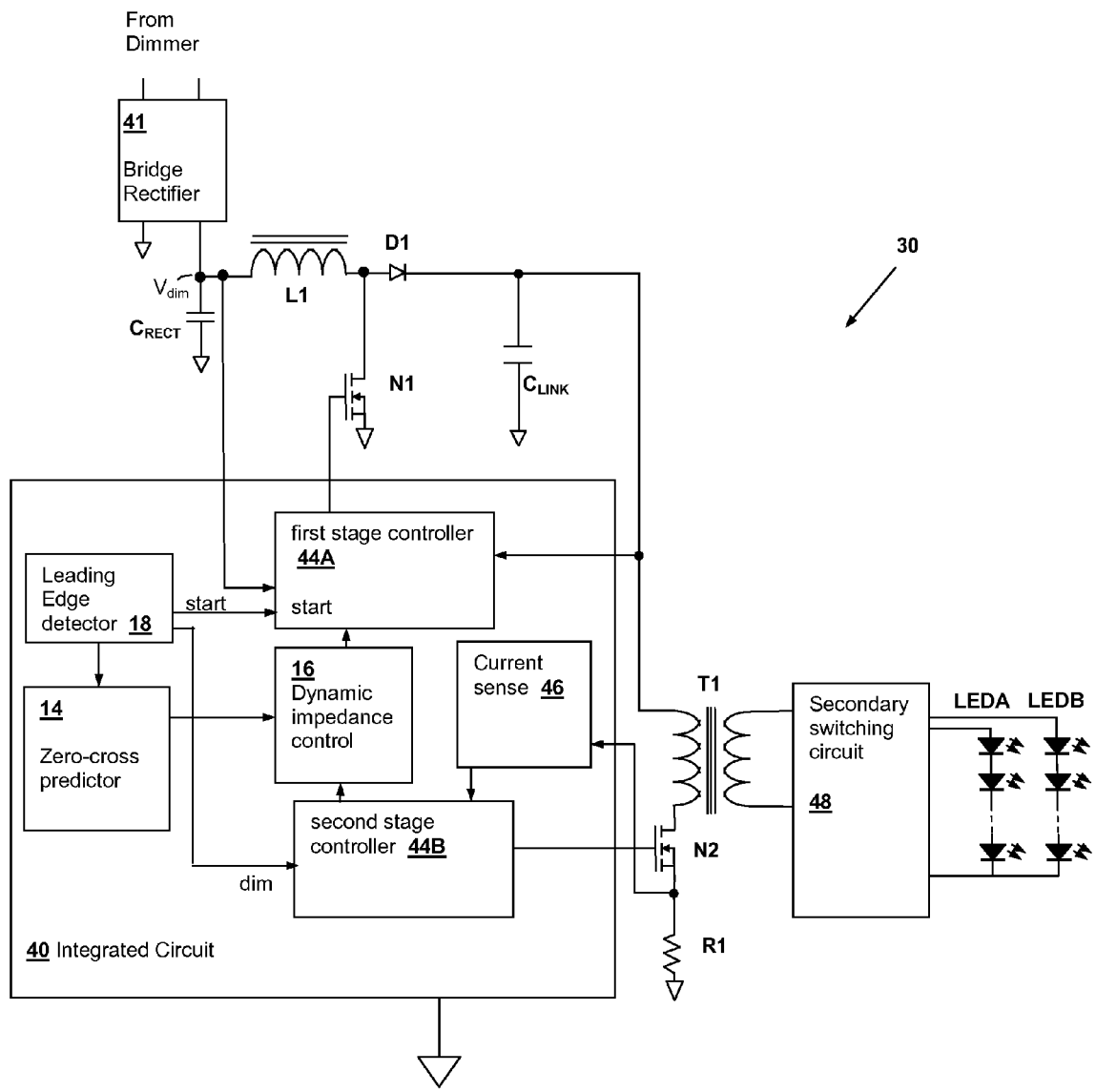
FIG. 4 is a simplified schematic diagram of a lighting circuit in accordance with another embodiment of the present invention.

Referring now to FIG. 4, a lighting circuit 30 in accordance with an embodiment of the present invention is shown. The circuit of FIG. 4 is provided to illustrate details of a two-stage switching power converter that may be used to implement switching power converters 26A-26C, as illustrated in FIGS. 3A-3C, respectively. The output of a dimmer is provided to a bridge rectifier 41 that generates a rectified dimmer output voltage $V_{dim}$. A capacitor $C_{RECT}$ provides filtering of higher frequency switching components generated by a buck input stage implemented by inductor L1, switching transistor N1, diode D1 and capacitor $C_{LINK}$. A resistor R1 provides for current-sensing of the primary current provided through transistor N2. An integrated circuit 40 provides control of transistor N1 from a first stage controller 44A and further controls a flyback converter stage from a second stage controller 44B that switches transistor N2 to provide current through a transformer T1 in response to feedback provided from current sensing circuit 46. Second stage controller provides information about energy requirements to dynamic impedance control circuit 16, which provides control indication to first stage controller 44A to dynamically control the impedance presented at the input terminal that receives the output of bridge rectifier 41, thereby controlling the impedance presented to the output of triac-controller dimmer 8. Zero-cross predictor 14 and leading edge detector 18 operate as described above for the various embodiments of the invention illustrated in FIGS. 3A-3C. Current for operating LEDs LEDA, LEDB may be supplied through a secondary switching circuit 48 that alternates application of the secondary current between LED strings, which may be of different color in order to provide a color profile that varies with the dimming value dim or under other control input. First stage controller 44A is activated by control signal zero as illustrated in the above-described embodiments of FIGS. 3A-3C, and the lighting circuit illustrated in FIG. 4 can be used to implement the embodiments of the invention depicted in FIGS. 3A-3C. Further details for supplying multiple strings of LEDs from a single secondary winding are disclosed in the above-incorporated U.S. Patent Application entitled "DIMMING MULTIPLE LIGHTING DEVICES BY ALTERNATING ENERGY TRANSFER FROM A MAGNETIC STORAGE ELEMENT."

Figure 5A:
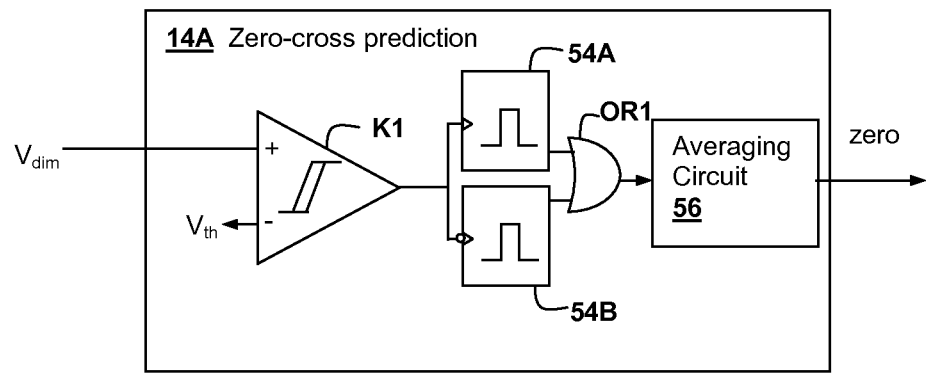
FIGS. 5A-5B are block diagrams of zero-cross determining circuits in accordance with alternative embodiments of the invention.

Referring now to FIG. 5A, a zero-cross detection circuit 14A as may be employed in the above-described embodiments of the invention is shown. A hysteresis comparator K1 detects when rectified dimmer output voltage $V_{DIM}$ exceeds threshold voltage $V_{th}$, and one-shots 54A and 54B generate pulses that are combined by logical-OR gate OR1 to provide a pulse at each zero-crossing of AC line voltage $V_{line}$. An averaging circuit 56, such as a digital processing block or PLL, is included to reconstruct the input AC line voltage $V_{line}$ phase from the rectified dimmer output voltage $V_{DIM}$, which may be accomplished as described in the above-incorporated U.S. Patent Application entitled "DIMMER OUTPUT EMULATION." The output of zero-cross prediction circuit 14A is a pulse that is asserted at the end of each half-cycle of AC line voltage $V_{line}$, and indicates to one of the above-described circuits, when to apply the glue impedance or current level at the output of triac-based dimmer circuit 8.

Figure 5B:
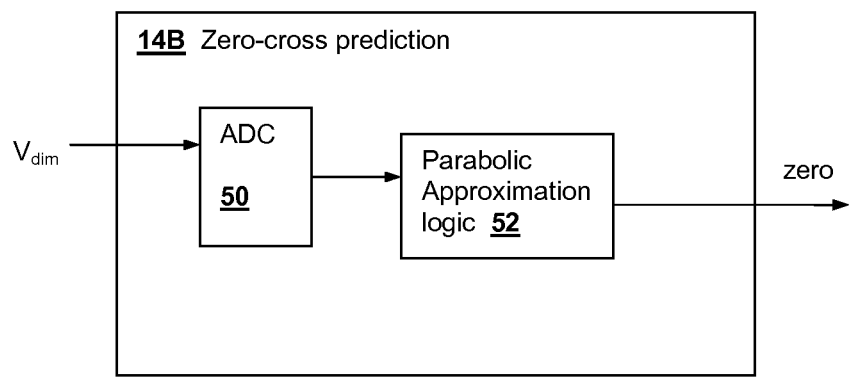

Referring now to FIG. 5B, a zero-cross prediction circuit as may be employed in the above-described embodiments of the invention is shown. An ADC 50 provides input to parabolic approximation logic 52 that generates control signal zero according to the predicted location of the zero-crossings of AC line voltage $V_{line}$. ADC 50 may be replaced by a pair of comparator and parabolic approximation logic 52 may be replaced by an analog circuit that performs piecewise approximation to approximate the waveshape of AC line voltage $V_{line}$ from the cut sine wave shape of rectified dimmer output voltage $V_{dim}$.

Figure 6A:
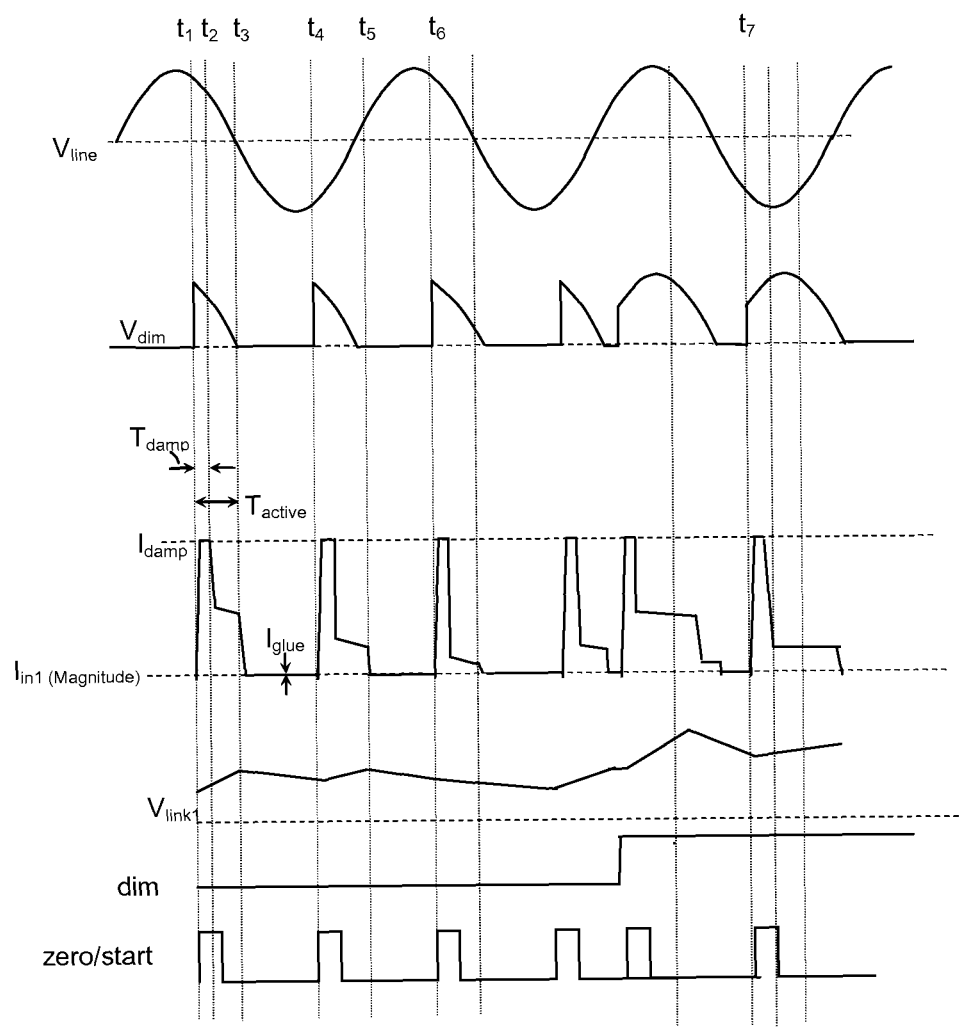
FIGS. 6A-6B are signal waveform diagrams illustrating signals within lighting circuits in accordance with embodiments of the present invention.

Referring now to FIG. 6A, signals within the above-described embodiments of the invention are shown in a signal waveform diagram. At time $t_1$, a leading edge of rectified dimmer output voltage $V_{dim}$ indicates a triac turn-on event and for time period $t_{damp}$, a greater current level of at least $I_{trip}$ is drawn from the output terminals of triac-based dimmer 8 of FIG. 1. Current waveform $I_{in1}$ corresponds to an input current drawn by replacement lighting device 10A of FIG. 3A or replacement lighting device 10B of FIG. 3B, having discrete and substantially constant values during the different portions of the half-cycle of AC line voltage $V_{line}$ between times $t_1$ and $t_2$, i.e. low-impedance interval $T_{damp}$ and the remainder of the active cycle of dimmer output voltage $V_{dim}$ between time $t_2$ and time $t_3$, during which a different impedance level/current draw is applied. Transitions in current waveform $I_{in1}$ cannot be too abrupt, or oscillation of EMI inductor $L_E$ and EMI capacitor $C_E$ can result, causing the triac to turn off at the wrong time. Voltage waveform $V_{link1}$ corresponds to link voltage $V_{link}$ when charged by the input stage of replacement lighting device 10A of FIG. 3A or replacement lighting device 10B of FIG. 3B. Between time $t_3$ and time $t_4$, the glue impedance or glue current level, is applied to the output of triac-based dimmer 8. Since the current is actually determined by the timer in the triac-based dimmer 8, the actual shape of the current will vary as the current passing through the timer circuit formed by capacitor $C_T$ and resistor $R_T$ as shown in FIG. 1. Therefore, the value of $I_{glue}$ is not generally constant, but is shown here as a minimum level to indicate that the inputs of the replacement lighting device is not in a high impedance state during the glue interval $T_{glue}$.

Figure 6B:
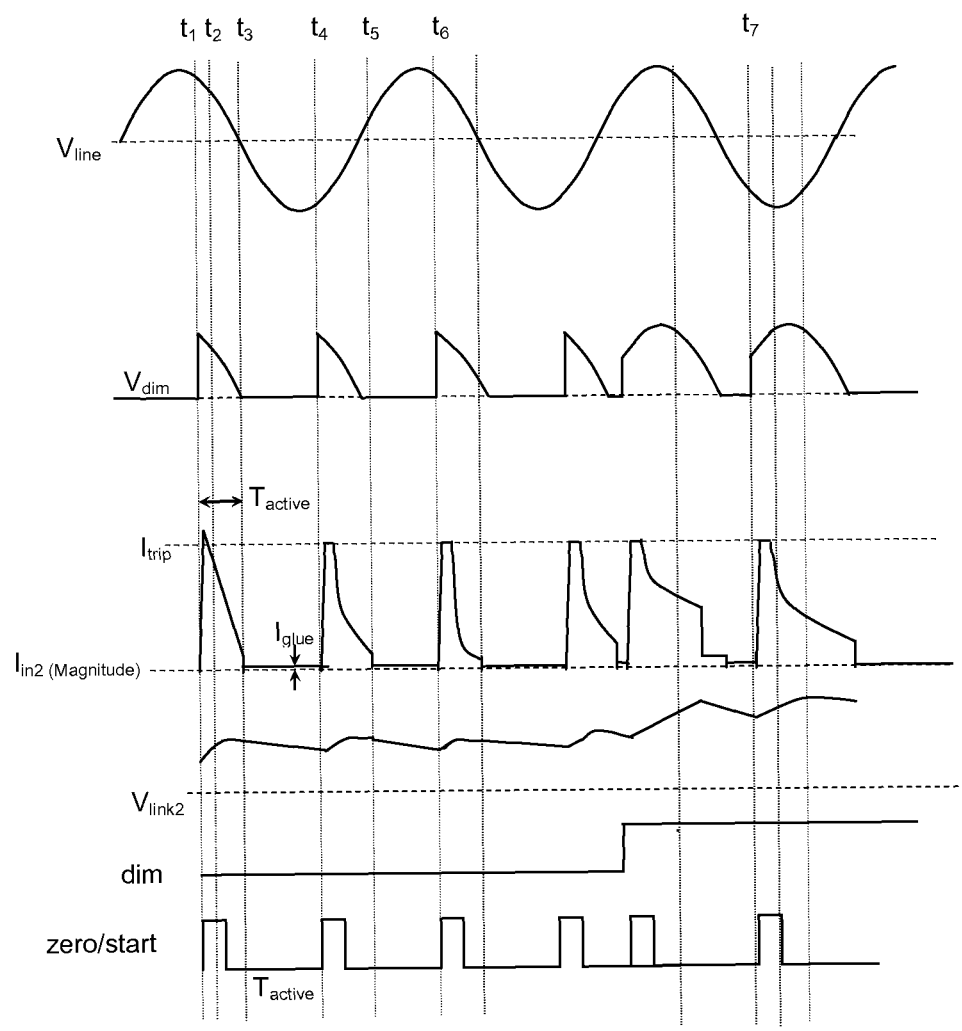

Referring now to FIG. 6B, a signal waveform diagram depicting signals within lighting circuits described above according to other embodiments of the invention. Current waveform $I_{in2}$ corresponds to an input current drawn by replacement lighting device 10C of FIG. 3C, in which a continuously changing current profile may be drawn from the output of triac-based dimmer 8 of FIG. 1. Voltage waveform $V_{link2}$ corresponds to link voltage $V_{link}$ when charged by the input stage of replacement lighting device 10C of FIG. 3C. In all of the above-described waveforms, energy is transferred from the output of triac-based dimmer 8 during an energy transfer time period $T_{active}$, which extends from leading-edge time $t_1$ until the end of the active period of triac-based dimmer 8, although in some circumstances, and in some embodiments, energy transfer will terminate before the end of the active period of triac-based dimmer 8, by lowering input current $I_{in}$ below the value of the hold current of the triac in triac-based dimmer 8. For example, in replacement lighting device 10A of FIG. 3A, since a dissipative load is available to extend the active triac cycle beyond the time at which sufficient energy has been transferred by switching power converter 12A, the actual energy transfer may be terminated earlier. Also, in some embodiments of the invention, it may not be necessary to extend the energy transfer period across the entire active cycle of triac-based dimmer, so that the active cycle is actually terminated by the replacement lighting device 10 of FIG. 1, ceasing current draw from the output of triac-based dimmer.

In both FIG. 6A and FIG. 6B, the cycles commencing at times $t_4$ and $t_5$ illustrate a decreasing need for energy transfer, as link voltage $V_{link1}$ and $V_{link2}$ increase in magnitude. Because replacement lighting device 10C uses a computed current profile, current $I_{in2}$ is shaped, except at the ends of each active interval and during the glue intervals. However, at time $t_7$, such a case is illustrated, due to a rising value of link voltage $V_{link2}$ and an active period dimmer output voltage $V_{dim}$ that is near maximum. Similarly, at time $t_7$ in FIG. 6A, current $I_{in1}$ illustrates a case that may be necessary when the level of energy transfer is so great for a period that voltage $V_{link1}$ would rise too high without terminating the active period of triac-based dimmer 8.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A circuit for powering one or more lighting devices from an output of a thyristor-switched dimmer circuit coupled to an AC voltage source, the circuit comprising:
    a switching power converter having an input for coupling to the output of the thyristor-switched dimmer circuit, a magnetic storage element for storing energy transferred from the input, and at least one output for supplying energy to the one or more lighting devices from the magnetic storage element; and
    a control circuit for operating the switching power converter during an active portion of half cycles of a voltage of the AC voltage source in which the switching power converter transfers energy from the output of the thyristor-switched dimmer circuit, wherein the control circuit determines durations of the active portion of the half cycles such that sufficient energy is transferred from the input to operate the one or more lighting devices until a beginning of an active portion of a subsequent half-cycle, wherein subsequent to the active portion of the half-cycles, a high impedance level is presented to the output of the thyristor-switched dimmer circuit during an idle period that extends until the subsequent half-cycle, wherein the half cycles extend between adjacent zero-crossings of the voltage of the AC voltage source.

2. The circuit of claim 1, wherein the switching power converter comprises:
    a first power converter stage having an input coupled to the output of the thyristor-switched dimmer circuit;
    a link capacitor coupled to an output of the first power converter stage; and
    a second power converter stage having an input coupled to the capacitor for transferring energy from the link capacitor to the one or more lighting devices.

3. The circuit of claim 2, wherein first power converter stage is coupled to the control circuit so that the control circuit controls the first power converter stage to transfer energy during the active portions of the half-cycles to charge the link capacitor in excess of the energy transferred from the second power converter stage to the one or more lighting devices during the corresponding half-cycles.

4. The circuit of claim 1, further comprising a load circuit for dissipating energy provided from the output of the thyristor-switched dimmer circuit during the active portions of the half-cycles, wherein the control circuit controls the load circuit to provide a minimum predetermined impedance level at the output of the thyristor-switched dimmer circuit.

5. The circuit of claim 1, further comprising a zero-crossing predicting circuit for predicting a zero-cross time of the voltage of the AC voltage source, wherein the control circuit has an input for receiving an output of the zero-crossing predicting circuit for indicating a beginning of the half-cycles of the voltage of the AC power source.

6. The circuit of claim 5, wherein the zero-cross predicting circuit is a circuit that computes the zero-cross time of the voltage of the AC power source from a waveshape of the voltage at the output of the thyristor-switched dimmer circuit during the active portions of the half-cycles.

7. The circuit of claim 5, wherein the zero-cross predicting circuit and the timer form part of a phase-lock loop that that calculates the zero-cross time of the voltage of the AC power source from phase comparisons of multiple periods of the AC power source with a phase of the timer.

8. A method of powering one or more lighting devices from an output of a thyristor-switched dimmer circuit, comprising:
    supplying energy to the one or more lighting devices by converting energy drawn from the output of the thyristor-switched dimmer circuit;
    determining a duration of active portion of half-cycles of a voltage of an AC voltage source that supplies an input of the thyristor-switched dimmer circuit for which the switching power converter transfers energy from the output of the thyristor-switched dimmer circuit, wherein the duration is determined such that sufficient energy is transferred from the input to operate the one or more lighting devices until a beginning of an active portion of a subsequent half-cycle; and
    controlling an impedance presented to the output of the thyristor-switched dimmer circuit such that a high impedance level is presented to the output of the output of the thyristor-switched dimmer circuit during an idle period immediately subsequent to the active time period, wherein the half cycles extend between adjacent zero-crossings of the voltage of the AC voltage source.

9. The method of claim 8, wherein the converting comprises:
    storing the energy drawn from the output of the thyristor-switched dimmer circuit in a link capacitor in a first converting stage; and
    transferring energy from the link capacitor to the one or more lighting devices by a second converting stage.

10. The method of claim 9, wherein the first converting stage transfers energy during the active period to charge the link capacitor in excess of the energy transferred by the second converting stage to the one or more lighting devices during at least a portion of a power line cycle of the AC power source.

11. The method of claim 8, further comprising dissipating energy provided from the output of the thyristor-switched dimmer circuit during the active portions of the half-cycles through a loading circuit, wherein the controlling controls the loading circuit to apply a predetermined minimum impedance level at the output of the thyristor-switched dimmer circuit during the active portions of the half-cycles.

12. The method of claim 8, further comprising predicting zero-cross times of the voltage of an AC power source coupled to an input of the thyristor-switched dimmer circuit and wherein the determining commences the active portions in conformity with the predicted zero-cross times.

13. The method of claim 12, wherein the predicting computes the voltage of the AC power source from a waveshape of the voltage at the output of the thyristor-switched dimmer circuit during the active portions of the half-cycles.

14. The method of claim 12, wherein the predicting is performed by a phase-lock loop that that calculates the zero-cross time of the voltage of the AC power source from phase comparisons of multiple periods of the AC power source with a phase of the timer.

15. An integrated circuit for operating a circuit that powers one or more lighting devices from an output of a thyristor-switched dimmer circuit, comprising:

a power converter control circuit having an input for coupling to the output of the thyristor-switched dimmer circuit and an output for controlling a switching power converter for supplying the one or more lighting devices from the output of the thyristor-switched dimmer circuit; and a timing control circuit for operating the switching power converter during an active portion of half cycles of a voltage of the AC voltage source in which the switching power converter transfers energy from the output of the thyristor-switched dimmer circuit, wherein the control circuit determines durations of the active portion of the half cycles such that sufficient energy is transferred from the input to operate the one or more lighting devices until a beginning of an active portion of a subsequent half-cycle, wherein subsequent to the active portion of the half-cycles, a high impedance level is presented to the output of the thyristor-switched dimmer circuit during an idle period that extends until the subsequent half-cycle, wherein the half cycles extend between adjacent zero-crossings of the voltage of the AC voltage source.

16. The integrated circuit of claim 15, wherein the power converter control circuit controls a two cascaded switching power converter stages coupled by a link capacitor that stores energy converter by a first one of the power converter stages from the output of the thyristor-switched dimmer circuit and wherein a second one of the power converter stages is controlled by the power converter control circuit to transfer energy from the link capacitor to the one or more lighting devices.

17. The integrated circuit of claim 16, wherein the power converter control circuit controls the first power converter stage to transfer energy during the active portions of the half-cycles to charge the link capacitor in excess of the energy transferred from the second power converter stage to the one or more lighting devices during the corresponding half-cycles.

18. The integrated circuit of claim 15, further comprising a load circuit for dissipating energy provided from the output of the thyristor-switched dimmer circuit during the active portions of the half-cycles, wherein the control circuit controls the load circuit to provide a minimum predetermined impedance level at the output of the thyristor-switched dimmer circuit.

19. The integrated circuit of claim 15, further comprising a zero-crossing predicting circuit for predicting a zero-cross time of the voltage of the AC voltage source, wherein the timing control circuit has an input for receiving an output of the zero-crossing predicting circuit for indicating a beginning of the half-cycles of the voltage of the AC power source.

20. The integrated circuit of claim 19, wherein the zero-cross predicting circuit is a circuit that computes the zero-cross time of the voltage of the AC power source from a waveshape of the voltage at the output of the thyristor-switched dimmer circuit during the active portions of the half-cycles.

21. The integrated circuit of claim 19, wherein the zero-cross predicting circuit and the timer form part of a phase-lock loop that that calculates the zero-cross time of the voltage of the AC power source from phase comparisons of multiple periods of the AC power source with a phase of the timer.

* * * * *